US012558200B2

(12) United States Patent
Steger

(10) Patent No.: US 12,558,200 B2
(45) Date of Patent: Feb. 24, 2026

(54) RETAINING DEVICE FOR A DENTAL WORKPIECE

(71) Applicant: Heinrich Steger, Bruneck (IT)

(72) Inventor: Heinrich Steger, Bruneck (IT)

( * ) Notice: Subject to any disclaimer, the term of this patent is extended or adjusted under 35 U.S.C. 154(b) by 868 days.

(21) Appl. No.: 17/692,877

(22) Filed: Mar. 11, 2022

(65) Prior Publication Data

US 2022/0192802 A1 Jun. 23, 2022

Related U.S. Application Data

(63) Continuation of application No. PCT/EP2020/075376, filed on Sep. 10, 2020.

(30) Foreign Application Priority Data

Sep. 12, 2019 (AT) ............................... A 50796/2019

(51) Int. Cl.
*A61C 13/00* (2006.01)
*B23Q 3/06* (2006.01)
*B25B 5/14* (2006.01)

(52) U.S. Cl.
CPC ...... *A61C 13/0006* (2013.01); *A61C 13/0022* (2013.01); *B25B 5/14* (2013.01); *B23Q 3/062* (2013.01)

(58) Field of Classification Search
CPC ................................................. A61C 13/0022
See application file for complete search history.

(56) References Cited

U.S. PATENT DOCUMENTS 8,382,085 B2 * 2/2013 Steger ................ A61C 13/0003
269/57
9,675,433 B2 * 6/2017 Cornell .................... B23Q 3/06
9,937,024 B2 * 4/2018 Steger ....................... B23C 3/00
(Continued)

FOREIGN PATENT DOCUMENTS

DE 20 2010 001 125 5/2010
DE 10 2012 201 744 8/2013
(Continued)

OTHER PUBLICATIONS

English Translation of WO-2007143765-A1 (Year: 2007).*
(Continued)

*Primary Examiner* — Jacob J Cigna
(74) *Attorney, Agent, or Firm* — Wenderoth, Lind & Ponack, L.L.P.

(57) ABSTRACT

A retaining device for a dental workpiece includes a retaining ring for receiving the dental workpiece, and a clamping device for clamping the dental workpiece on the retaining ring. The clamping device has a bearing surface for the dental workpiece, and the bearing surface is mounted or formed on the retaining ring and protrudes radially in the direction of the central axis. At least one clamping element is mounted movably on the retaining ring, and in a clamping position, the dental workpiece can be clamped between the clamping element and the bearing surface. The retaining ring has an inner ring element, on which the bearing surface is mounted or formed and on which the clamping element is movably mounted, an outer ring element, and a fixing device for releasably fixing the inner ring element to the outer ring element.

21 Claims, 16 Drawing Sheets

(56)           References Cited

U.S. PATENT DOCUMENTS

| | | | | |
|---|---|---|---|---|
| 10,213,841 | B2 | 2/2019 | Steger | |
| 10,953,504 | B2 | 3/2021 | Schumacher | |
| 2001/0029010 | A1* | 10/2001 | Wells | A61C 9/0093 |
| | | | | 433/49 |
| 2005/0060868 | A1* | 3/2005 | McMurtry | A61C 13/0004 |
| | | | | 29/559 |
| 2016/0206410 | A1 | 7/2016 | Steger | |
| 2016/0317258 | A1 | 11/2016 | Steger | |
| 2018/0200851 | A1 | 7/2018 | Schumacher | |

FOREIGN PATENT DOCUMENTS

| | | | | | |
|---|---|---|---|---|---|
| DE | 20 2013 103 515 | | 11/2013 | | |
| DE | 10 2018 000 338 | | 7/2018 | | |
| EP | 2 628 566 | | 11/2015 | | |
| EP | 3 095 412 | | 11/2016 | | |
| EP | 3 047 818 | | 9/2018 | | |
| EP | 3372192 | A1 * | 9/2018 | | A61C 13/0022 |
| EP | 3 216 420 | | 12/2018 | | |
| EP | 3513765 | A1 * | 7/2019 | | |
| EP | 3698751 | B1 * | 4/2024 | | A61C 13/0006 |
| KR | 20180126038 | A * | 11/2018 | | A61C 13/0004 |
| KR | 101997032 | B1 * | 10/2019 | | A61C 13/0004 |
| WO | WO-2007143765 | A1 * | 12/2007 | | A61C 13/0022 |
| WO | WO-2014016186 | A1 * | 1/2014 | | B23Q 1/0072 |

OTHER PUBLICATIONS

Translation of WO-2007143765-A1 (Year: 2007).*
International Search Report issued Oct. 22, 2020 in International
(PCT) Application No. PCT/EP2020/075376.

* cited by examiner

Section B-B

Section A-A

Section E-E

Section F-F

RETAINING DEVICE FOR A DENTAL WORKPIECE

BACKGROUND OF THE INVENTION

The present invention concerns a retaining device for a disk-shaped dental workpiece comprising a retaining ring formed around a central axis for receiving the dental workpiece, and a clamping device for clamping the dental workpiece to the retaining ring. The clamping device has at least one supporting surface for the dental workpiece, with the supporting surface is mounted or formed on the retaining ring and projects radially in the direction of the central axis, and has at least one clamping element mounted moveably on the retaining ring. In a clamping position, the dental workpiece can be clamped between the clamping element and the supporting surface. In addition, the present invention concerns a processing apparatus for processing a dental workpiece having such a retaining device and a method for processing a dental workpiece in such a processing apparatus.

Various machines for working on dental workpieces have been available for many years. So-called CNC processing machines are often used. Dental workpieces are processed in those machines. In most cases, those dental workpieces comprise a ceramic, zirconium, or metal. Processing is effected for example by milling, grinding, cutting or the like.

An example of an apparatus of the general kind set forth is disclosed in EP 3 216 420 B1. More specifically, shown therein is a retaining ring to which a dental workpiece can be clamped. In specific terms, arranged at the inside of the retaining ring is a projection which protrudes in the direction of a central axis (see for example reference numeral 8 in FIGS. 1b and 4b). In addition, there are so-called clamping portions mounted rotatably to the retaining ring, wherein in a clamping position, the dental workpiece (blank) is gripped between three clamping portions and three corresponding clamping surfaces.

An apparatus which is also of the general kind set forth is disclosed in EP 2 628 566 B1. Here, too, the dental workpiece is clamped in a similar way in a retaining ring having three fixing elements.

In comparison, EP 3 047 818 B1 discloses a state of the art which is of a different general kind. Here, the blank is not clamped directly to the supporting surfaces which project radially in the direction of a central axis, but a separate retaining device (clamping block or clamping mechanism) is clamped to the retaining ring. That separate retaining device in turn is of such a configuration that a plurality of smaller workpieces (blanks) can be clamped to that retaining device by way of a fixing device (for example in the form of a clamping ring or a clamping wedge provided with a gap). A disadvantage in that respect is inter alia that fixing of the individual blanks is effected only by a clamping or gripping force operative in a radial direction. If the workpiece therefore is narrower than is intended for any reasons, it cannot be fixedly held in place. In addition, slipping in the axial direction is possible with such a clamping configuration.

A further device having a blank holder (corresponds to a retaining device) for a dental milling machine is disclosed in DE 10 2018 000 338 A1. Here, in particular FIGS. 1 through 6 show a state of the art involving a device of the general kind set forth, in accordance with which a dental workpiece rests on a radially inwardly directed projection of a retaining ring. In that case, that supporting surface is referred to as a support edge (reference 51) which projects radially into the clamping ring (reference 50). DE 10 2018 000 338 A1 also discloses an embodiment which is of a different general kind in FIGS. 18 and 19. Here, a so-called blank adaptor (reference 106) is fitted by way of fixing attachments in an edge region of the receiving means. The blank adaptor serves to hold cuboidal blanks which are fixed in the correct position in corresponding receiving means of the blank adaptor by means of screws. This means that the blank holder cannot be used only for cylindrical disk-shaped blanks but for cuboidal blanks as workpiece. A disadvantage here is that cylindrical disk-shaped workpieces cannot be held by way of that additional blank adaptor, but only smaller cuboidal workpieces. That is the case in particular because the blank adaptor is not of an annular configuration.

In general, as regards retaining devices of the general kind set forth, it is often necessary to remove the dental workpiece from the retaining device in the course of the working operation, for example in order to process other workpieces in the meantime and/or to measure the half-processed workpiece.

A problem then is for continued working to clamp that workpiece precisely back in the retaining device or the retaining ring thereof. Thus, the workpiece can be displaced for example by a few millimeters, and that results in errors in the further processing operation. As a result, processing is imprecise and in the worst-case scenario even results in processed workpieces which are unusable.

SUMMARY OF THE INVENTION

Therefore, the object of the present invention is to provide a retaining device which is improved over the state of the art. In particular, the invention seeks to provide that the above-discussed disadvantages are overcome. In particular, the invention seeks to provide the possibility to re-fit the dental workpiece precisely and to the greatest possible extent unchanged in terms of its position in the retaining device after having been removed.

Thus, the retaining ring has an inner ring element on which the at least one supporting surface is mounted or formed and on which the at least one clamping element is moveably mounted, an outer ring element, and a fixing device for releasably (and preferably positively lockingly) fixing the inner ring element to the outer ring element. In other words, the retaining ring is in two parts (in the peripheral direction). The outer ring element always remains on the rest of the machine while the dental workpiece together with the inner ring element can be released. This means that the dental workpiece is not at all detached from the radially inwardly projecting supporting surfaces but remains on those supporting surfaces and the clamping elements of the inner ring element. If the dental workpiece is to be re-fitted, it is then only necessary to connect the inner ring element to the outer ring element by the fixing device (preferably in positively locking relationship).

By way of example, a preferred embodiment provides that the clamping device has a plurality of, preferably three, clamping elements which are arranged regularly around the central axis and are uniformly spaced from the central axis and are mounted to the inner ring element and a plurality of, preferably three, supporting surfaces which are arranged regularly around the central axis and are uniformly spaced from the central axis and are arranged on the inner ring element. Of course, it is also possible for even more—for example four or five—clamping elements and supporting surfaces to be provided.

Regarding the central axis, it is to be noted that it passes centrally through the space surrounded by the retaining ring.

That space corresponds to a receiving region for the dental workpiece. In other words, the retaining ring forms or defines a receiving region into which the disk-shaped dental workpiece can be correspondingly inserted. The retaining ring extends substantially along a plane oriented at a right angle to the central axis.

If a disk-shaped dental workpiece is used that dental workpiece is of a substantially cylindrical configuration about the central axis, particularly preferably in the form of a right circular cylinder.

The at least one supporting surface is oriented transversely relative to the central axis. The at least one supporting surface can have a rounded surface. Preferably, however, the at least one supporting surface is flat and extends at a right angle to the central axis.

The precise configuration of the at least one clamping element can in itself be of any configuration, as long as the dental workpiece can be clamped to the retaining ring by way of the clamping element. The at least one clamping element can be in the form of a retaining pin which is moveable in the radial direction automatically, preferably pneumatically. Preferably, however, the at least one clamping element has a spindle pin mounted in the inner ring element rotatably about an axis of rotation and a clamping surface which is oriented substantially at a right angle to the axis of rotation and connected to the spindle pin and preferably oriented parallel to the supporting surface.

The fixing device can in itself be of any desired configuration as long as a fixed connection can be achieved between the inner ring element and the outer ring element. A possible embodiment provides that the fixing device is in the form of an automatically actuable, preferably pneumatic, fixing device. Preferably, however, manual actuation (for example with clamping screws) is provided. Particularly preferably, the fixing device has at least one supporting element mounted or formed on the outer ring element, a counterpart supporting portion mounted or formed on the inner ring element and corresponding to the supporting element, and at least one fixing element mounted moveably on the outer ring element. In a fixing position, the inner ring element can be fixed between the fixing element and the supporting element.

In principle, it is possible that there is only one single fixing element and one single supporting element. Preferably, however, the fixing device has a plurality of, preferably three, supporting elements which are arranged regularly around the central axis and are uniformly spaced from the central axis and arranged on the outer ring element, a plurality of, preferably three, counterpart supporting portions which are arranged regularly around the central axis and spaced uniformly from the central axis and arranged on the inner ring element, and a plurality of, preferably three, fixing elements arranged regularly on the outer ring element.

In principle, it is possible that the at least one supporting element is provided along a plane oriented at a right angle to the central axis. It is preferable for exact positioning and fixing that the at least one fixing element has a spindle pin mounted in the outer ring element rotatably about an axis of rotation and a fixing surface oriented substantially at a right angle to the axis of rotation and connected to the spindle pin.

In a particularly preferred embodiment, arranged at an inner surface of the outer ring element, that faces towards the inner ring element, is a positioning element, preferably a positioning nose, and arranged at an outer surface of the inner ring element, that faces towards the outer ring element, is a counterpart positioning portion corresponding to the positioning element. That permits the inner ring element to be refitted in a correct position. As there is practically no clearance between the positioning element and the counterpart positioning portion, this affords a repetition accuracy in the axial and radial directions of less than 0.01 millimeters, preferably about 0.003 millimeters. The positioning element and the counterpart positioning portion are arranged only at one location of a 360° region around the central axis. This therefore affords absolute positional accuracy.

The precise configuration of the clamping device and the fixing device is of any desired nature, as long as clamping and fixing respectively is possible. To permit simple fixing on a large scale, it is preferably provided that the individual components of the fixing device and the clamping device are substantially identical. More specifically, that concerns the clamping element and the fixing element. They each can be in the form of clamping screws (or so-called clamping claws). The fixing elements and clamping elements can each be actuated manually by way of a tool. More specifically, rotation can be effected about the respective axis of rotation so that a change between a fixing and clamping position and a respective release position is possible.

In regard to the retaining ring, it is to be noted in general that the precise form thereof can be any desired configuration as long as the dental workpiece can be suitably received. If, therefore, the dental workpiece has a substantially cuboidal configuration, the retaining ring can have a suitable quadrangular shape or can have a quadrangular inner surface. Preferably, however, the retaining ring is substantially in the shape of a circular ring.

If the retaining ring has a configuration (in cross-section) substantially in the form of a circular ring, then the inside diameter should be matched to the outside diameter of the (disk-shaped) dental workpiece. According to a preferred embodiment, the inside diameter of the retaining ring (without the radially projecting supporting surfaces and clamping elements) is between 70 mm and 125 mm, preferably between 85 mm and 105 mm. Particularly preferably, the inside diameter is 95 mm.

Preferably, the inner ring element (or the inner surface in cross-section) is substantially in the form of a circular ring. If that is the case, preferably the outside diameter of the inner ring element is between 100 mm and 140 mm, preferably between 110 mm and 130 mm, particularly preferably between 120 mm and 125 mm.

Further preferably, the ratio of inside diameter of the retaining ring to outside diameter of the inner ring element is between 1 to 1.2 and 1 to 1.35, particularly preferably between 1 to 1.25 and 1 to 1.3. In other words the outside diameter of the inner ring element is about a quarter larger than the inside diameter of the retaining ring.

It is also preferable that the outer ring element (or the inner surface thereof in cross-section) is substantially in the form of a circular ring and has an inside diameter corresponding to the outside diameter of the inner ring element. In regard to the inside diameter of the outer ring element, the radially inwardly projecting supporting elements or fixing elements are not taken into consideration. Accordingly, substantially the same values apply in regard to the ratio of inside diameter of the outer ring element to the inside diameter of the overall retaining ring, as for the ratio of the outside diameter of the inner ring element to the inside diameter of the overall retaining ring.

The retaining device can in principle be designed in such way that it is adapted to be stationary relative to a carrier. If that is the case, then for processing the dental workpiece it is necessary that all spatial movements can be carried out by a processing tool.

In order to enable a better construction and handling in this case, there is preferably a preferably ring-shaped retaining ring receiving means, to which the retaining ring is mounted moveably, preferably rotatably.

In addition, particularly preferably there can be a first drive device, preferably mounted to the retaining ring receiving means, for moving, preferably rotating, the retaining ring relative to the retaining ring receiving means. The first drive means can involve an electric motor.

A further preferred embodiment provides a carrier to which the retaining ring receiving means is mounted moveably, preferably rotatably—driven by a second drive device. That second drive device can also involve an electric motor.

A processing apparatus is provided for processing a dental workpiece, that has a retaining device according to the invention.

That processing apparatus is preferably in the form of a CNC processing machine. Particularly preferably, the processing apparatus includes a housing, at least one processing spindle moveable relative to the housing, at least one third drive device for moving the processing spindle relative to the housing, at least one processing tool mounted to the processing spindle, preferably in the form of a milling cutter, and a fourth drive device for moving, preferably rotating, the processing tool relative to the processing spindle. The third and fourth drive devices, too, preferably comprise electric motors.

In addition, preferably the carrier of the retaining device is mounted to the housing of the processing apparatus or is in one piece with said housing. Accordingly, the retaining ring of the retaining device is moveable relative to the housing of the processing apparatus.

The processing apparatus can also have an open-loop or closed-loop control unit. A processing program can be performed by that open-loop or closed-loop control unit. In other words, the retaining device and the remaining components of the processing apparatus are actuated in dependence on that processing program. For example, a dental blank can be worked out of the dental workpiece by means of the processing program on the basis of a 3D data set. Such a blank can be, for example, in the form of an abutment, a crown, a bridge, an individual tooth, and so forth. That resulting blank can then be subsequently subjected to further working (for example sintered) in order ultimately to be fitted to a patient by a dental professional.

Moreover, an arrangement includes a processing apparatus and a dental workpiece. Particularly preferably, that arrangement includes a dental workpiece which is substantially of a disk-shaped configuration. Particularly preferably precisely one single disk-shaped (or circular cylinder-shaped dental workpiece) can be or is clamped in the retaining ring of the retaining device.

As already mentioned, the invention also concerns a method of processing an in particular disk-shaped dental workpiece in a processing apparatus according to the invention. In that respect, the steps of receiving the dental workpiece in the retaining ring, clamping the dental workpiece by way of the clamping device to the retaining ring, and processing the dental workpiece by the processing tool are performed. Such steps are widely used and are already known in relation to CNC processing machines.

In addition, there are steps of releasing the inner ring element together with the processed dental workpiece clamped therein from the outer ring element, passing the inner ring element together with the dental workpiece to a further processing apparatus, preferably a measuring apparatus, or to a storage location, refitting the inner ring element together with the dental workpiece in the outer ring element, positionally accurate positioning of the inner ring element to the outer ring element, and continuing the processing of said dental workpiece clamped in the inner ring element.

Release of the inner ring element is preferably effected manually with a suitable tool. Passing or transporting the inner ring element to a further processing apparatus can also be effected by hand. For example, the ring element together with the dental workpiece can be taken to another processing apparatus in which the dental workpiece is processed with another processing tool. Particularly preferably, however, the dental workpiece is taken to a measurement or inspection device in which the dental workpiece is measured. The data acquired in that measurement procedure can then be used or taken into account in relation to a further processing operation. The step of fitting the inner ring element to the outer ring element again is preferably also again carried out by hand with a suitable tool, in which case preferably the positioning element and the counterpart positioning portion are used for fixing it in the correct position. Processing of the dental workpiece can then be continued or resumed.

BRIEF DESCRIPTION OF THE DRAWINGS

Further details and advantages of the present invention are described more fully hereinafter by means of the specific description with reference to the embodiments illustrated in the drawings in which.

DETAILED DESCRIPTION OF THE INVENTION

Figure 1:
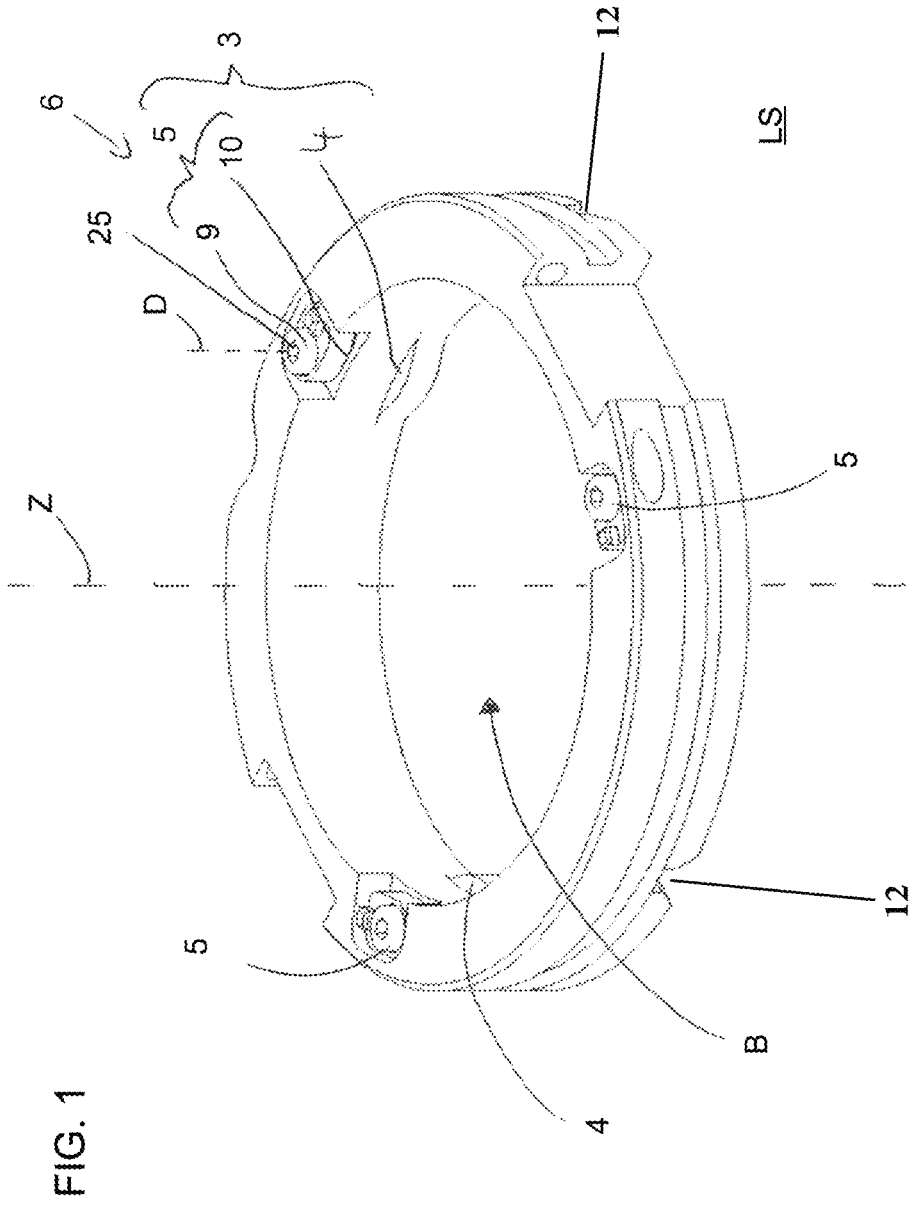
FIG. 1 is a perspective view of the inner ring element.

FIG. 1 shows a perspective view of a part of a retaining ring 2—more specifically an inner ring element 6. That inner ring element 6 has a ring-shaped configuration around a central axis Z. The inner ring element 6 (as with the entire retaining ring 2) extends along a plane oriented at a right angle to the central axis Z. The inner ring element 6 has supporting surfaces 4. The supporting surfaces 4 project radially in the direction of the central axis Z into a receiving region B of the retaining device 1. The receiving region B is a circular inner space of the inner ring element 6 defined by a circular inner surface of the inner ring element 6, and a workpiece W is to be mounted in the circular inner space (see, e.g., FIG. 10). In addition, clamping elements 5 are arranged on the inner ring element 6. The clamping elements 5 include a spindle pin 9 and a clamping surface 10. The spindle pin 9 is rotatable together with the clamping surface 10 about the axis of rotation D (oriented parallel to the central axis Z). At its surface, the clamping element 5 has a recess 25 (in this case of a hexagonal configuration), into which a suitable tool (for example a hexagonal tool) can engage. By actuation of the clamping element 5 by way of the tool, the clamping device 3 is moveable from a release position LS into a clamping position ES and vice-versa. The supporting surface 4 is oriented at a right angle to the central axis Z. The same applies to the clamping surface 10 of the clamping element 5.

Figure 2:
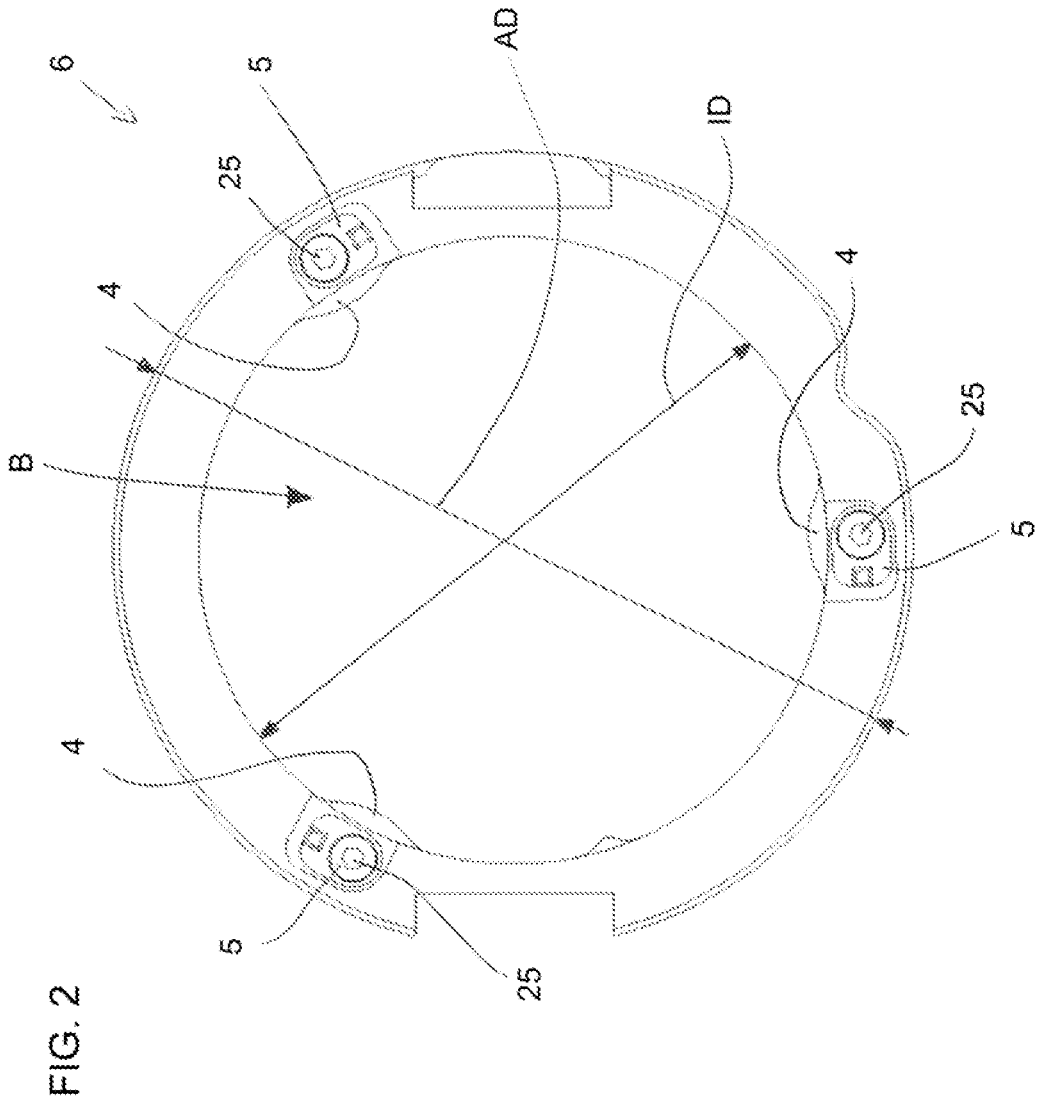
FIG. 2 is a plan view of the inner ring element shown in FIG. 1.

FIG. 2 shows a plan view of the inner ring element 6 shown in FIG. 1. It will be seen that the three supporting surfaces 4 and the three clamping elements 5 of the clamping device 3 are arranged regularly (i.e., spaced evenly) around the central axis Z, project radially inwardly, and are each at the same spacing relative to the central axis Z. It can also be seen that the inner ring element 6 extends around the receiving region B. The inside diameter ID of that inner ring element 6—without having regard to the radially projecting supporting surfaces 4—is between 85 mm and 105 mm. In a specific embodiment, the inside diameter ID is 95 mm. The outside diameter AD of that inner ring element 6 is between 110 mm and 130 mm. In a specific embodiment the outside diameter AD is 122 mm. That gives a ratio of inside diameter ID to outside diameter AD of about 1 to 1.27.

FIG. 3 again shows a perspective view of the inner ring element 6, with the clamping device 3 now being in the clamping position ES. That is effected by the clamping element 5 having been rotated through about 90° about the axis of rotation D by suitable actuation thereof.

Figure 3:
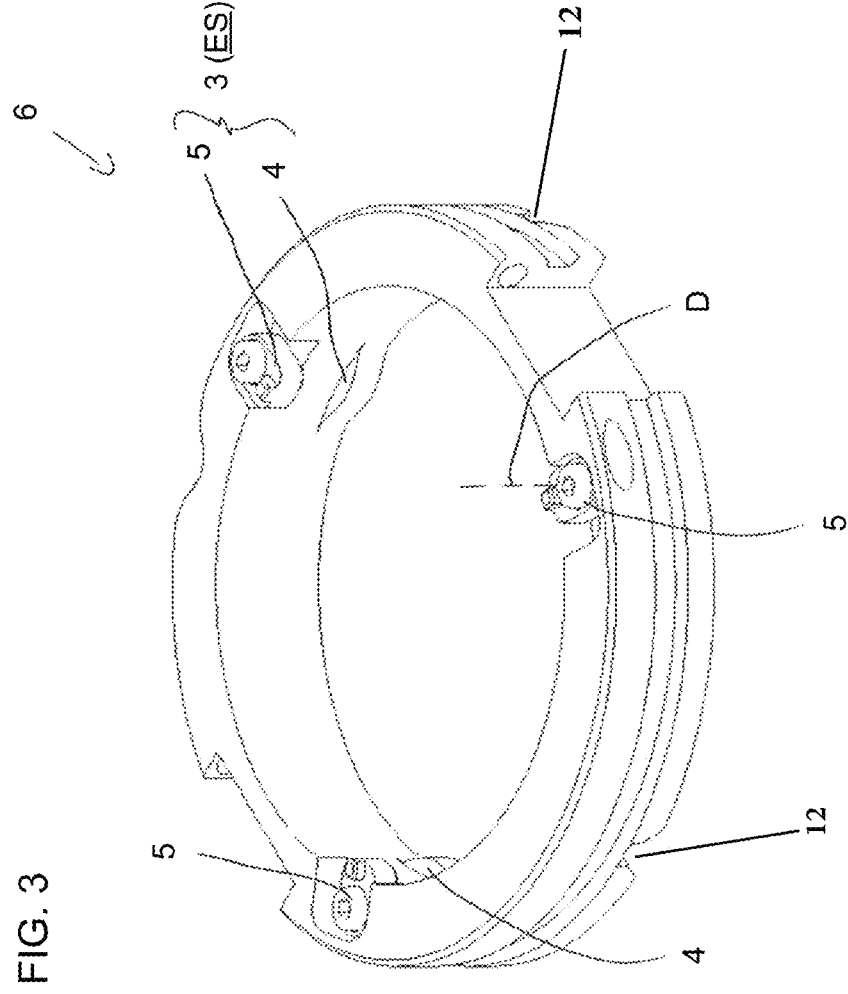
FIG. 3 is a perspective view of the inner ring element with clamping element in the clamping position.
Figure 4:
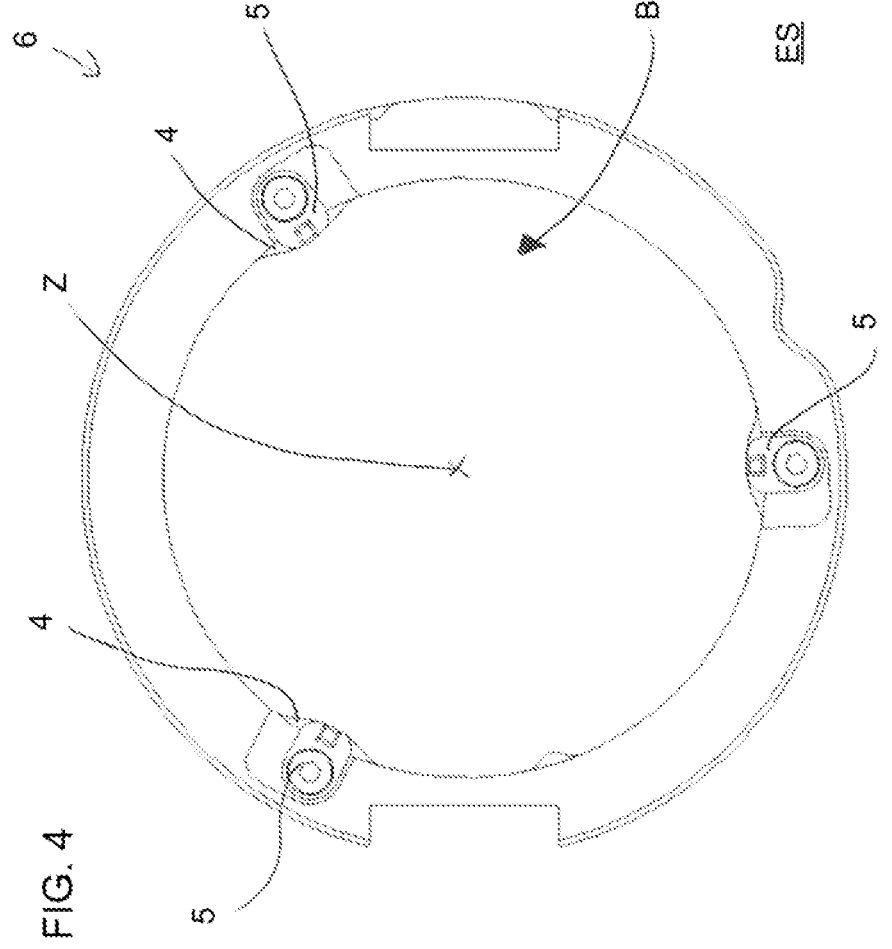
FIG. 4 is a plan view of the inner ring element shown in FIG. 3.

FIG. 4 shows a plan view corresponding to FIG. 3 of the inner ring element 6. It will be seen that the clamping surfaces 10 of the clamping elements 5 as viewed in the direction of the central axis Z are disposed precisely above the supporting surfaces 4. This means that in that clamping position ES, the clamping surfaces 10 project radially in the direction of the central axis Z into the receiving region B.

Figure 5:
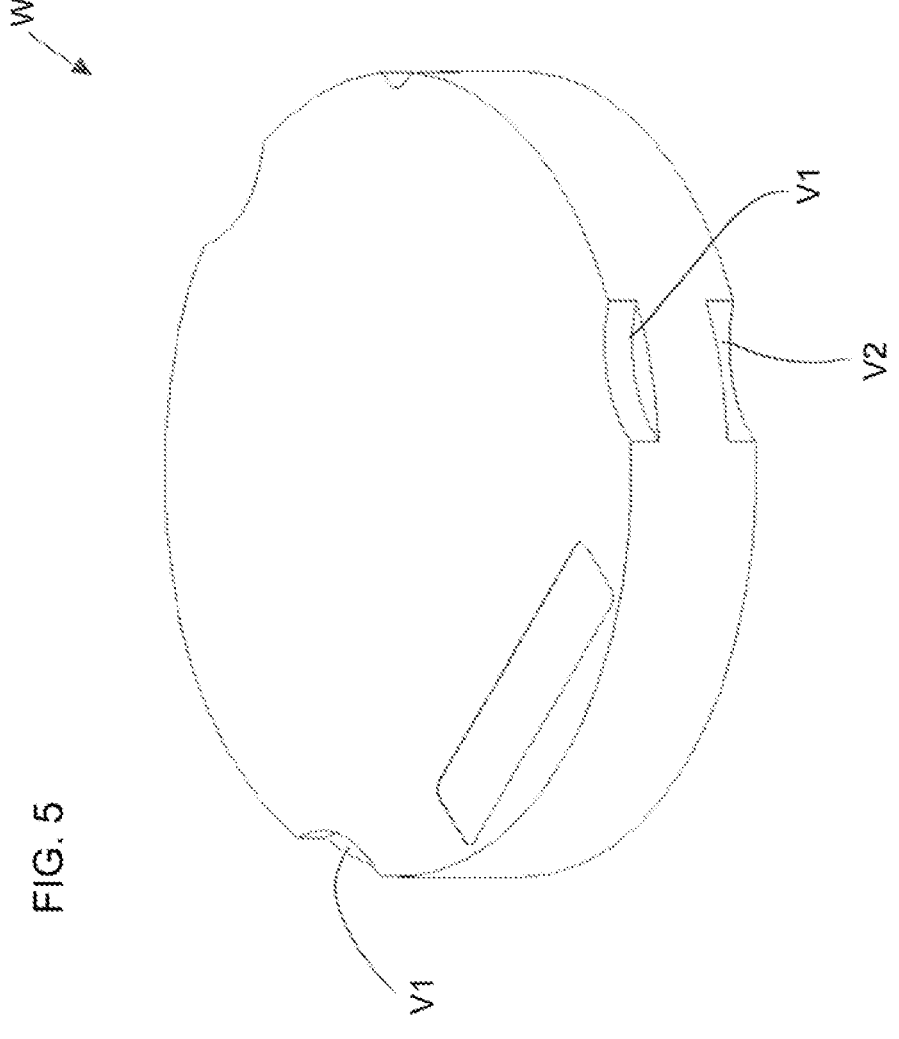
FIG. 5 is a perspective view of a dental workpiece.

FIG. 5 shows a perspective view of a dental workpiece W. That dental workpiece has a substantially disk-shaped configuration—more specifically in the shape of a circular cylinder. The recesses V1 and V2 are provided at lateral regions of that dental workpiece. The recess V1 corresponds to the clamping element 5 while the recess V2 corresponds to the supporting surface 4. The dental workpiece W is of such a configuration that it has substantially the same dimensions as the receiving region B of the retaining ring 2. In a preferred embodiment, the dental workpiece W has an outside diameter of 95 mm.

Figure 6:
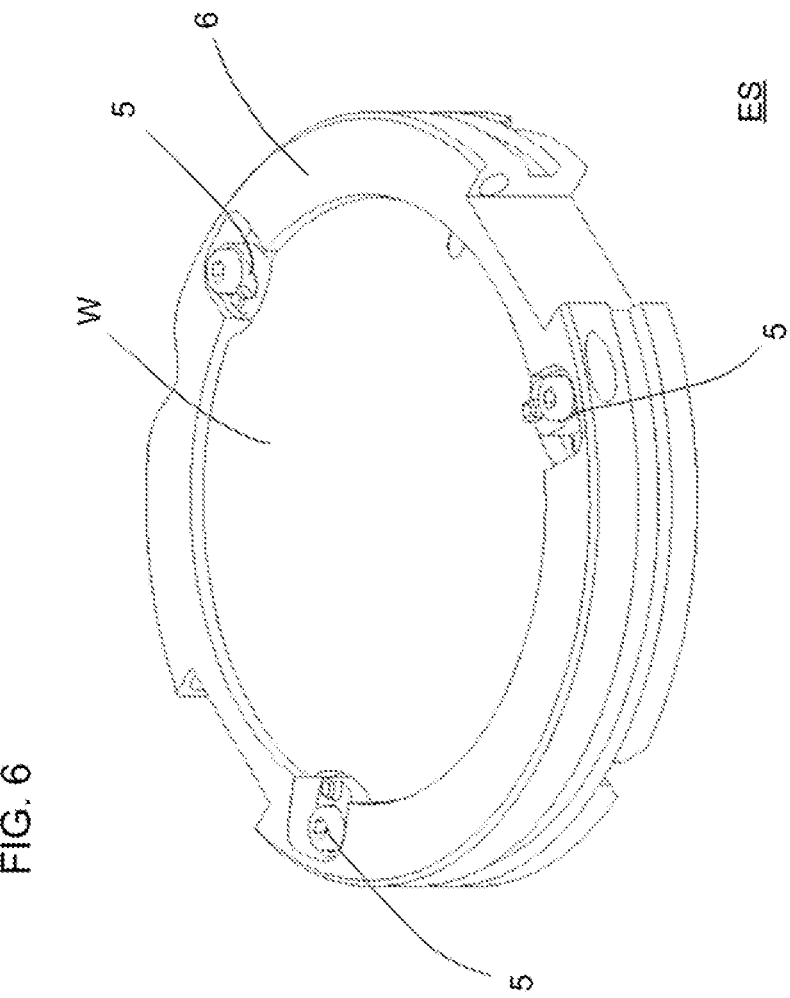
FIG. 6 is a perspective view of the inner ring element with the clamped dental workpiece.

It will be seen from FIG. 6 how the dental workpiece W is fitted into the inner ring element 6 and clamped fast by the clamping device 3. In specific terms, the clamping elements 5 of the clamping device 3 are in the clamping position ES so that the dental workpiece W is clamped between the clamping surfaces 10 of the clamping elements 5 and the respective corresponding supporting surfaces 4 of the clamping device 3 by the recesses V1 and V2 in the workpiece. That provides a firm connection or fixing of the dental workpiece W to the inner ring element 6.

Figure 7:
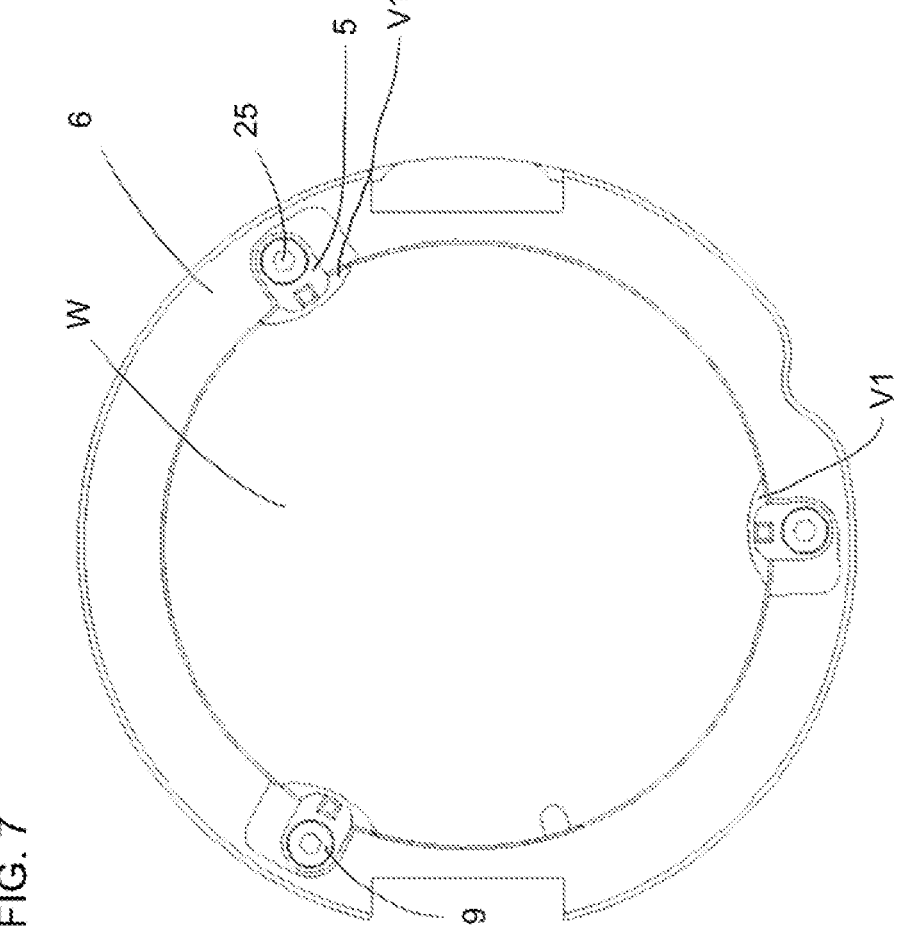
FIG. 7 is a plan view matching FIG. 6.

FIG. 7 shows a plan view of the inner ring element 6 and the dental workpiece W clamped therein, as shown in FIG. 6.

Figure 8:
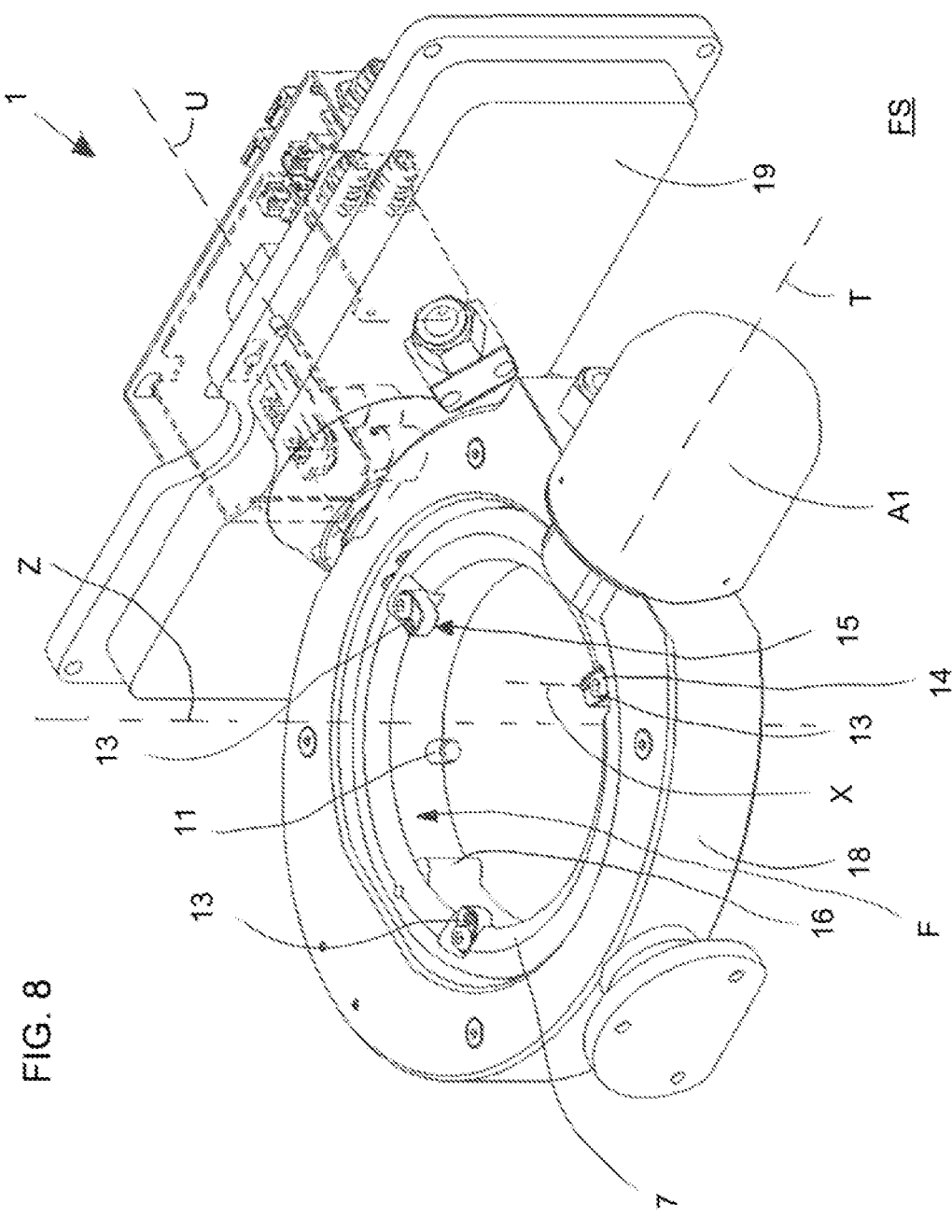
FIG. 8 is a perspective view of the outer ring element with retaining ring receiving means and carrier.

FIG. 8 shows a perspective view of other substantial components of the retaining device 1. In this case, the inner ring element 6 and the dental workpiece W are not (yet) shown. In contrast, the Figure shows the outer ring element 7. That ring element also extends around the central axis Z. The outer ring element 7 extends along a plane oriented at a right angle to the central axis Z. Supporting elements 11 are arranged at the outer ring element 7. Those supporting elements 11 project radially in the direction of the central axis Z. Those supporting elements 11 are formed or arranged at an inner surface F of the outer ring element 7, the inner surface F facing towards the inner ring element 6. More specifically, the supporting elements 11 have a substantially pin-shaped configuration. In addition, FIG. 8 shows the fixing elements 13 arranged at the outer ring element 7. Here the fixing elements 13 are in the fixing position FS. This means that, by virtue of a rotation of the spindle pin 14 about the axis of rotation X, the fixing surfaces 15 are disposed in that fixing position FS in which the fixing surfaces 15 project radially in the direction of the central axis Z.

FIG. 8 also shows the retaining ring receiver 18 in addition to the outer ring element 7. The outer ring element 7 is mounted to the retaining ring receiver 18 rotatably about the axis T. That movement is initiated by the first drive device A1. FIG. 8 also shows the carrier 19. The retaining ring receiver 18 is mounted to the carrier 19 rotatably about the axis U. The movement of the retaining ring receiver 18 about the axis U is initiated or controlled by the second drive device A2.

Figure 9:
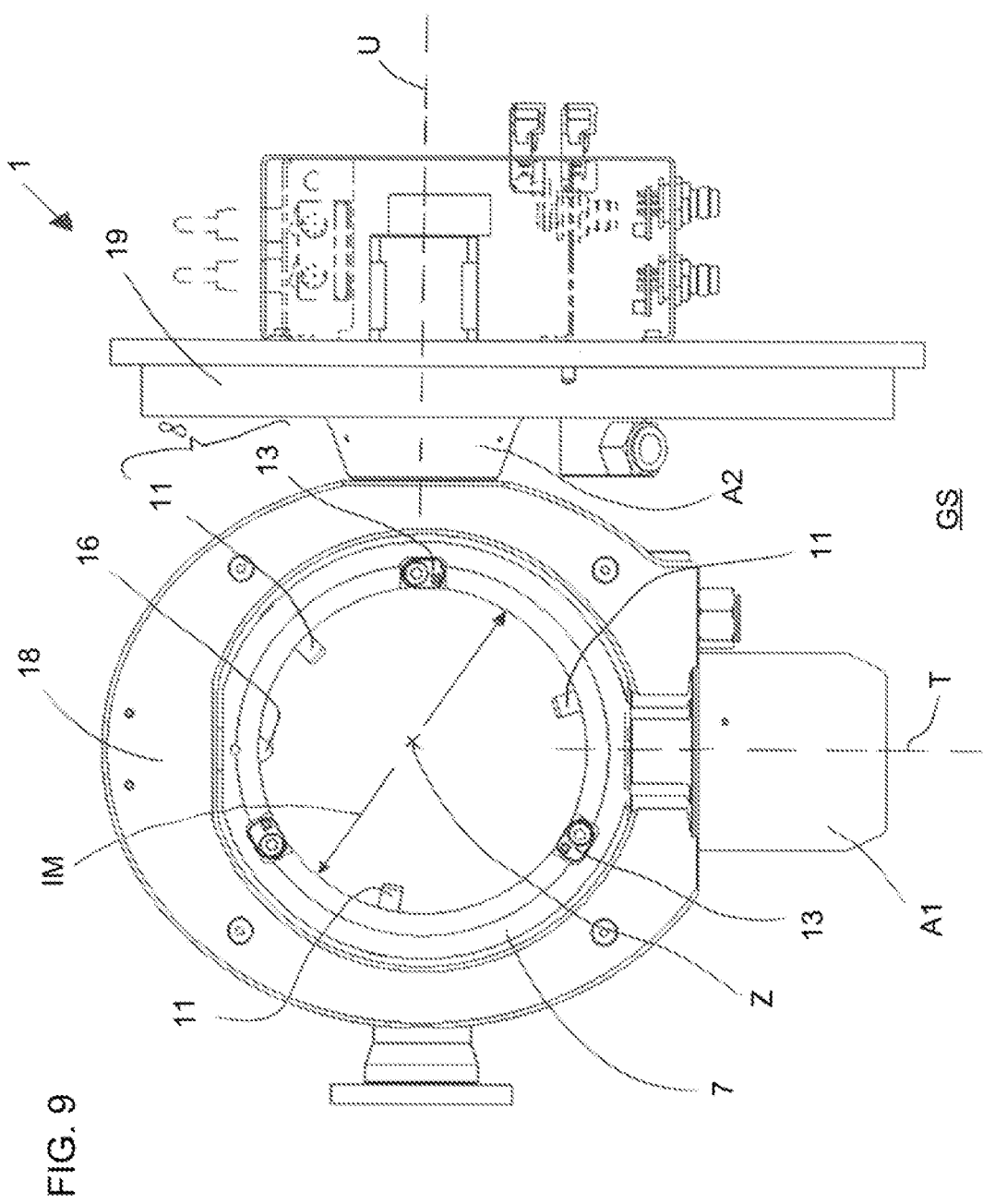
FIG. 9 is a plan view matching FIG. 8.

FIG. 9 shows a plan view of the retaining device 1 shown in FIG. 8. The only difference is that the fixing elements 13 are in the released position GS. It is possible to see the three supporting elements 11 arranged on the outer ring element 7. It is also possible to see in this view the positioning element 16 which projects from the outer ring element 7 in the direction of the central axis Z. The Figure also shows the inside diameter IM of the outer ring element 7 (without taking account of the radially inwardly projecting supporting elements 11). That inside diameter IM corresponds to the outside diameter AD of the inner ring element 6. In specific terms, that inside diameter IM is about 122 mm so that the inner ring element 6 fits thereinto as precisely as possible.

Figure 10:
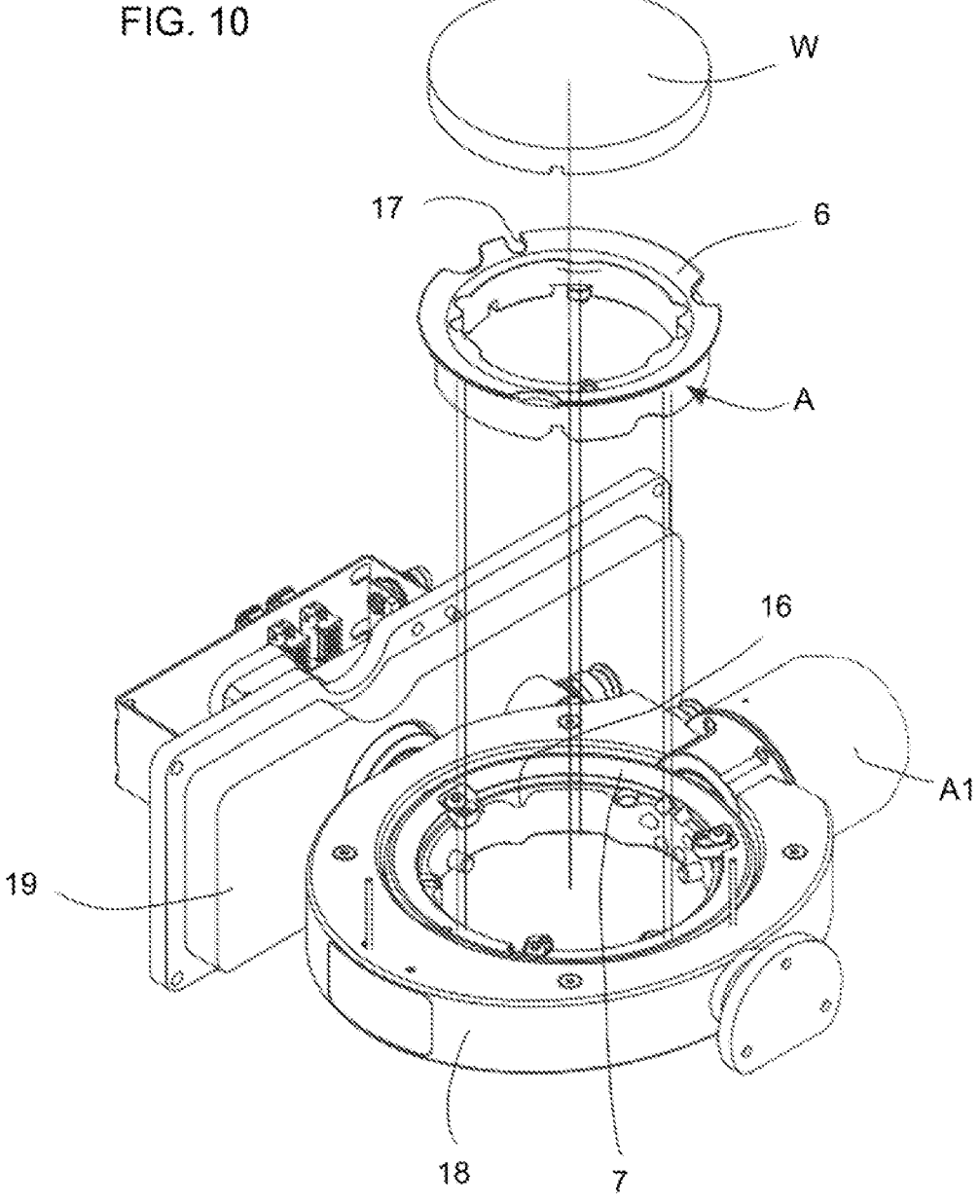
FIG. 10 is a perspective view of a retaining device upon assembly.

Starting from that FIG. 9 the inner ring element 6 together with the dental workpiece W as shown in FIG. 6 can be fitted into the outer ring element 7. That insertion movement is illustrated in FIG. 10. The dental workpiece W and the inner ring element 6 are inserted into the outer ring element 7 from above. A counterpart positioning portion 17 is provided for precise positioning at the outer surface A of the inner ring element 6, the counterpart positioning portion 17 corresponding to the positioning element 16 of the outer ring element 7 and guaranteeing that the two ring elements 7, 6 are fixed to each other in the correct position.

Figure 11:
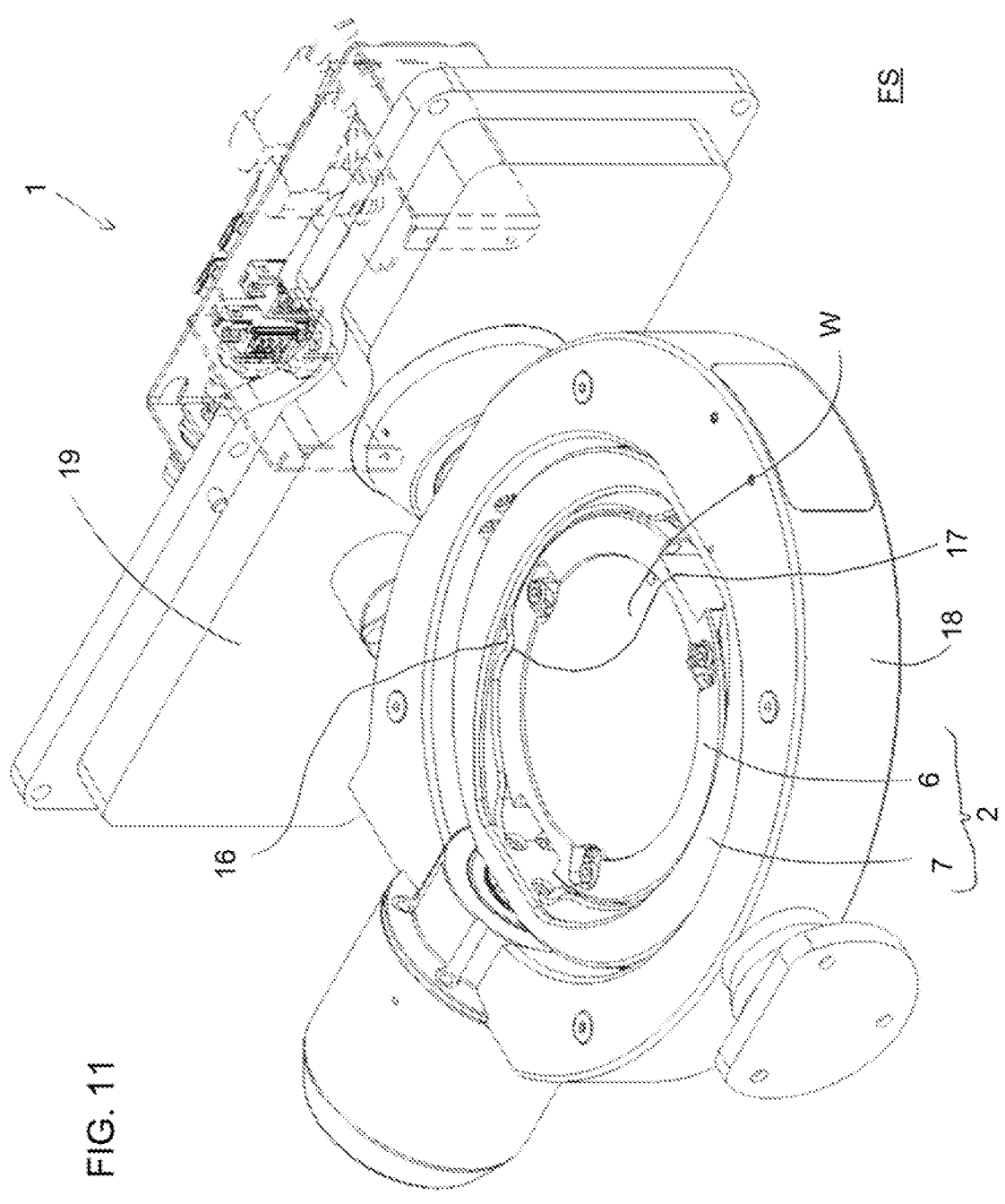
FIG. 11 is a perspective view of the assembled retaining device.

As soon as the insertion movement is concluded that affords a retaining device 1 as shown in FIG. 11. The inner ring element 6 is clamped between the fixing elements 13 and the supporting elements 11 of the fixing device 8 by suitable movement of the fixing elements 13 thereby giving the fixing position FS. The inner ring element 6 and the outer ring element 7 jointly form the retaining ring 2 for the workpiece W.

Figure 12:
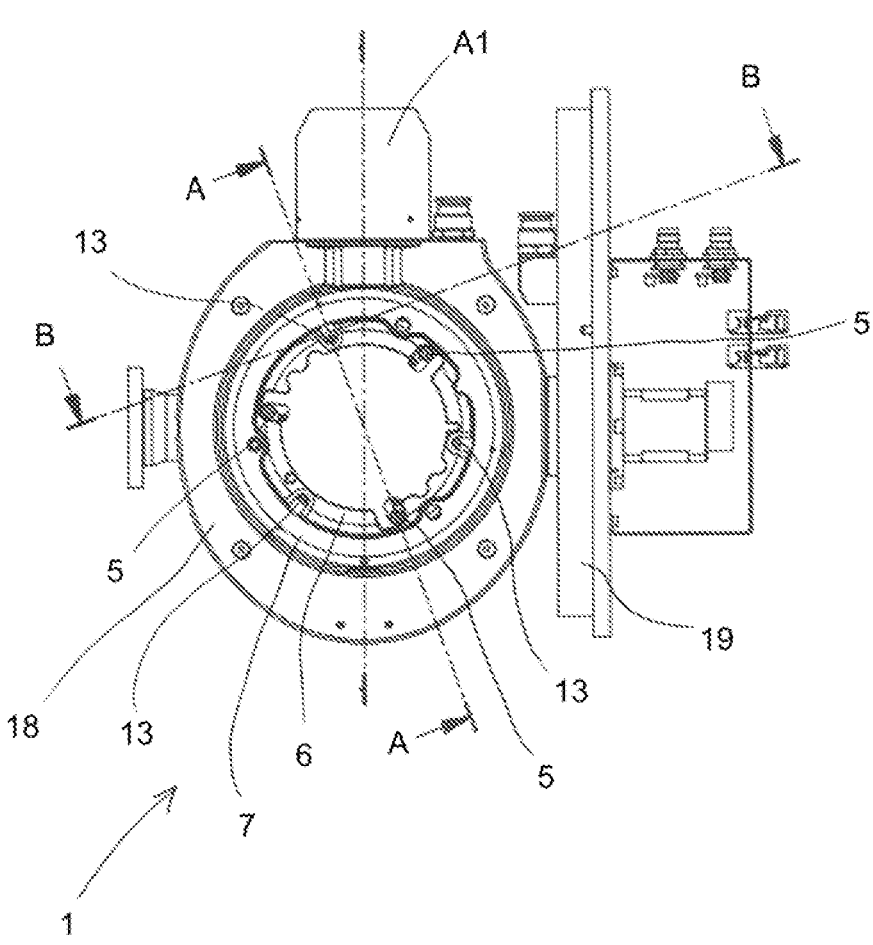
FIG. 12 is a plan view of a retaining device with section lines.

FIG. 12 shows a plan view of the retaining device 1 (without the workpiece W), the section lines for the sections A-A and B-B being shown therein. The two section lines pass region-wise through a fixing element of the fixing device 8. The section line for the section A-A additionally passes through a clamping element 5 of the clamping device 3.

Figures 13, 14:
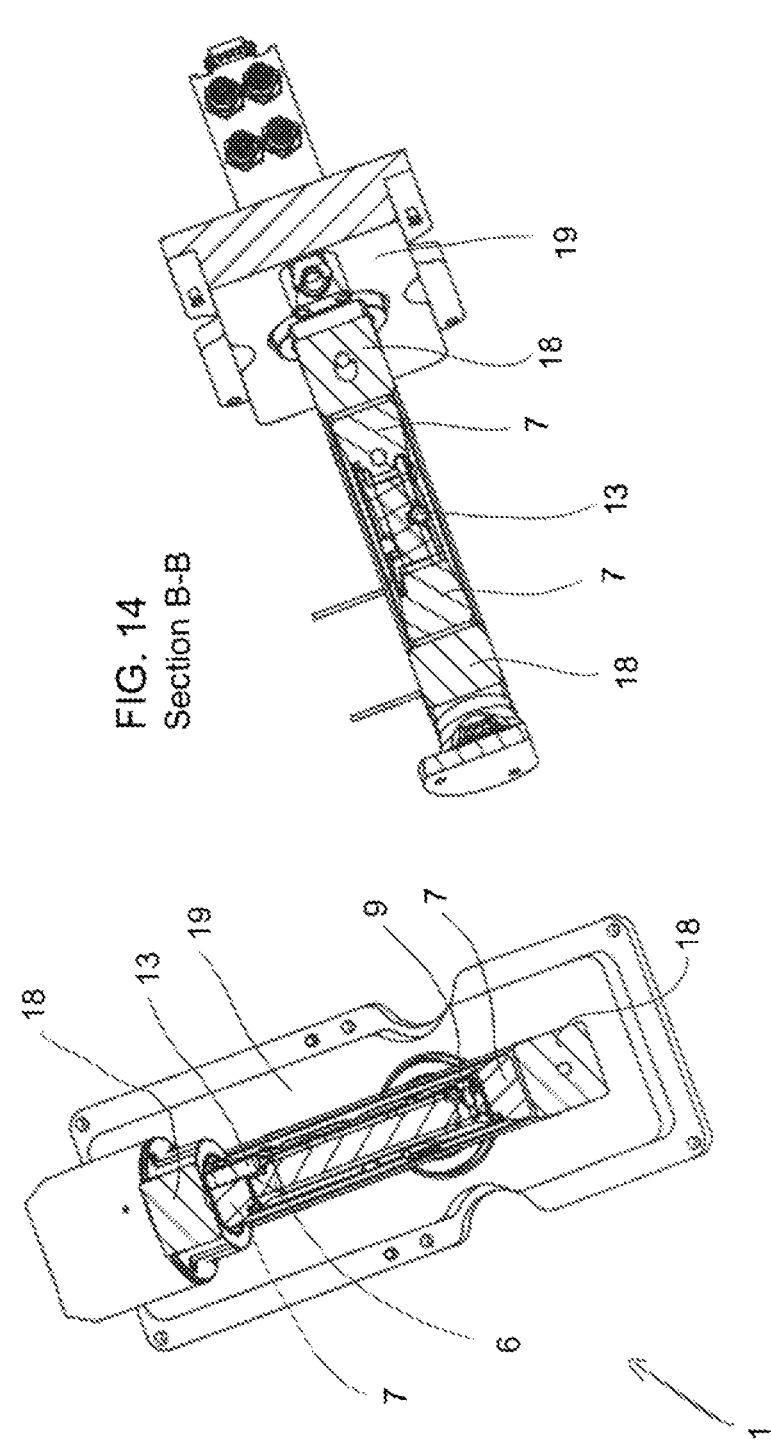
FIG. 13 shows the section A-A through the retaining device of FIG. 12.
FIG. 14 shows the section B-B through the retaining device of FIG. 12.

FIG. 13 shows the section A-A through the retaining device 1. More specifically, it shows the fixing element 13 in cross-section, which holds the inner ring element 6 to the outer ring element 7. It is also possible to see the spindle pin of the clamping element 5.

FIG. 14 shows the section B-B through the retaining device. Besides the outer ring element 7 and the retaining ring receiver 18 the Figure also shows the fixing element.

Figure 15:
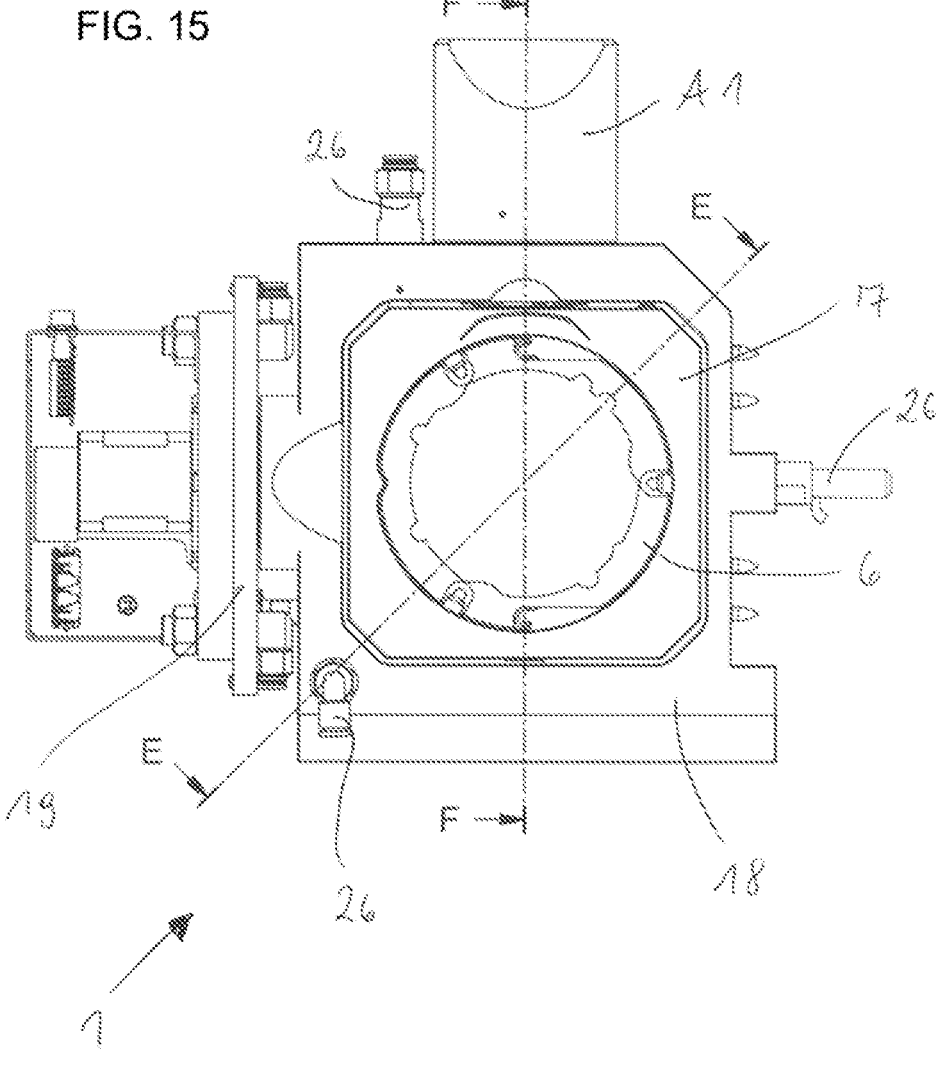
FIG. 15 is a plan view of a partially pneumatically actuated retaining device with section lines.

FIG. 15 shows an embodiment in which both the clamping device 3 and also FIG. 15 shows an embodiment in which both the clamping device 3 and also the fixing device 8 are pneumatically actuable. In the plan view of FIG. 15, the retaining ring receiver 18 and the outer ring element 7 are part of a quadrangular configuration while the inner ring element 6 is substantially in the form of a circular ring. FIG. 15 also shows a plurality of pneumatic connections 26 connected to a pneumatic pressure source (not shown). The section lines of sections E-E and F-F are shown in FIG. 15.

Figures 16, 17:
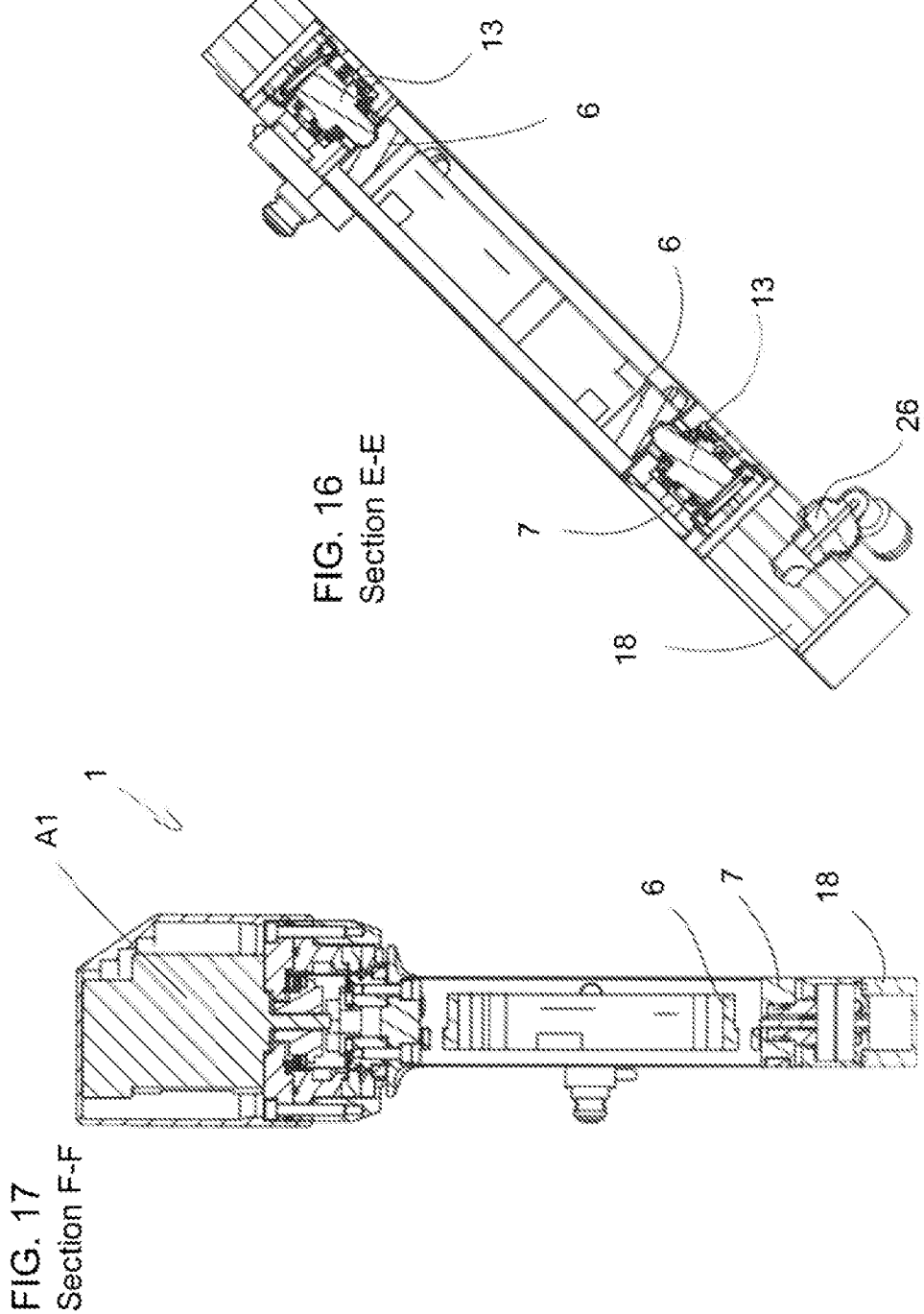
FIG. 16 shows the section E-E through the retaining device of FIG. 15.
FIG. 17 shows the section F-F through the retaining device of FIG. 15.

FIG. 16 shows the section E-E with a pneumatic connection 26 in cross-section. The Figure also shows two pin-shaped, pneumatically actuable fixing elements 13 in cross-section.

FIG. 17 shows the section F-F through the retaining device 1.

Figure 18:
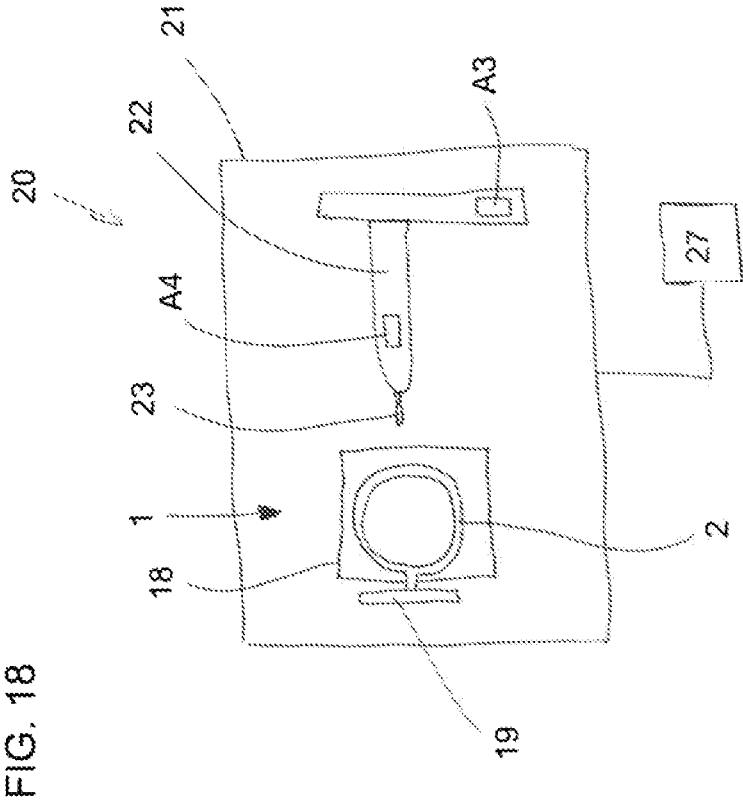
FIG. 18 is a diagrammatic view of a processing apparatus, and FIG. 19 diagrammatically shows a method implementation for processing a dental workpiece.

FIG. 18 diagrammatically shows a processing apparatus 20. The processing apparatus 20 includes a housing 21. At least one processing spindle 22 is mounted to the housing 21 moveably, preferably linearly. That movement is initiated by a third drive device (spindle drive device) A3. A processing tool 23, preferably in the form of a milling cutter, is mounted to the spindle 22. The processing tool 23 is moveable relatitive to the processing spindle 22 by a fourth drive device (tool drive device) A4. Part of the processing apparatus 20 is also a retaining device 1. That retaining device 1 includes the carrier 19 fixed to the housing 21. The retaining ring 2 is mounted moveably to the carrier 19. The movements of the individual components can be controlled by way of the open-loop or closed-loop control unit 27.

Figure 19:
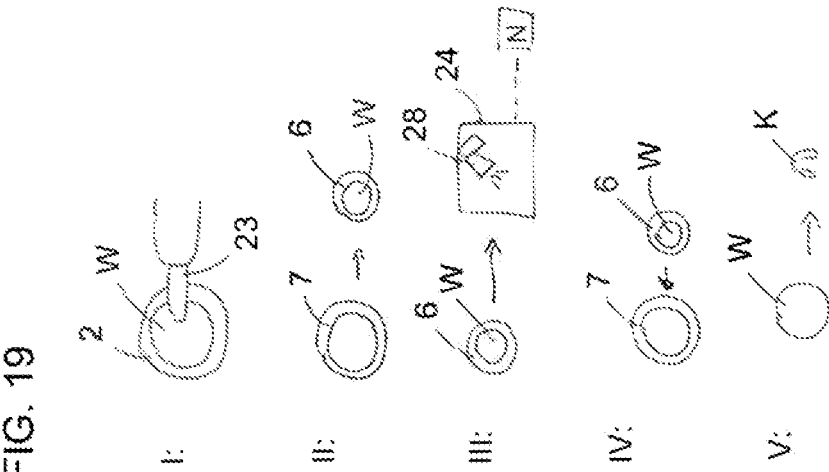

FIG. 19 diagrammatically shows the individual steps in the production method. In step I the workpiece W is clamped in the retaining ring 2 and is processed by the processing tool 23. In step II the inner ring element 6 together with the dental workpiece W is released from the outer ring element 7. Step III diagrammatically shows how the dental workpiece W together with the inner ring element 6 is transported to a further processing apparatus 24. That processing apparatus 24 can be in the form of a measuring apparatus in which for example the surface of the dental workpiece W is scanned by means of a camera 28 and thereby surface data N are generated. Then as shown in step IV the (semi-processed) dental workpiece W together with the inner ring element 6 is again fitted into the outer ring element 7 in the correct position so that processing of the dental workpiece W shown in step I can be continued. At the end as shown in step IV there is a dental prosthesis K which can then be fitted to a patient.

LIST OF REFERENCES

1 retaining device
2 retaining ring
3 clamping device
4 supporting surface
5 clamping element
6 inner ring element
7 outer ring element
8 fixing device
9 spindle pin
10 clamping surface
11 supporting element
12 counterpart supporting portion
13 fixing element
14 spindle pin
15 fixing surface
16 positioning element
17 counterpart positioning element
18 retaining ring receiving means
19 carrier
20 processing apparatus
21 housing
22 processing spindle
23 processing tool
24 further processing apparatus
25 recess
26 pneumatic connections
27 open-loop or closed-loop control unit
28 camera
A1 first drive device
A2 second drive device
A3 third drive device
A4 fourth drive device
W dental workpiece
Z central axis
ES clamping position
D axis of rotation
FS fixing position
X axis of rotation
F inner surface
A outer surface
LS release position
V1 recess
V2 recess
B receiving region
T axis
U axis
GS released position
N surface data
K dental prosthesis
ID inside diameter
AD outside diameter
IM inside diameter

The invention claimed is:

1. A retaining device for retaining a disk-shaped dental workpiece, the retaining device comprising:
a retaining ring having a central axis and configured to receive the dental workpiece, and
a clamping device configured to clamp the dental workpiece to the retaining ring, the clamping device including:
a supporting surface for supporting the dental workpiece, the supporting surface being mounted or formed on the retaining ring and projecting radially in the direction of the central axis, and a clamping element mounted moveably on the retaining ring, the clamping device being configured to clamp the dental workpiece between the clamping element and the supporting surface in a clamping position, wherein the retaining ring includes:

an inner ring element having a circular inner space defined by a circular inner surface on which the supporting surface is mounted or formed, and the clamping element is moveably mounted on the inner ring element, the workpiece to be mounted within the circular inner space of the inner ring element so as to be clamped between the clamping element and the supporting surface, an outer ring element in which the inner ring element is to be mounted, and a fixing device configured to releasably fix the inner ring element to the outer ring element, the fixing device including:

a plurality of supporting elements spaced apart uniformly around the central axis and uniformly spaced from the central axis and arranged on the outer ring element, a plurality of counterpart supporting portions spaced apart uniformly around the central axis and spaced uniformly from the central axis and arranged on the inner ring element so as to correspond to the plurality of supporting elements, and a plurality of fixing elements mounted movably on and spaced apart uniformly on the outer ring element such that, in a fixing position, the inner ring element is fixed between the fixing elements and the supporting elements, wherein the fixing device is configured to, upon removal of the inner ring element from the outer ring element, ensure the inner ring element is re-fittable into the outer ring element in the same exact position relative to the outer ring element as before removal of the inner ring element.

2. The retaining device as set forth in claim 1, wherein the fixing element includes: a spindle pin mounted in the outer ring element rotatably about an axis of rotation, and a fixing surface oriented substantially at a right angle to the axis of rotation and connected to the spindle pin.

3. The retaining device as set forth in claim 1, wherein: the plurality of supporting elements comprises three supporting elements, the plurality of counterpart supporting portions comprises three counterpart supporting portions, and the plurality of fixing elements comprises three fixing elements.

4. The retaining device as set forth in claim 1, wherein: the clamping element of the clamping device is one of a plurality of clamping elements spaced apart uniformly around the central axis and uniformly spaced from the central axis and mounted to the inner ring element, and the supporting surface of the clamping device is one of a plurality of supporting surfaces spaced apart uniformly around the central axis and uniformly spaced from the central axis and arranged on the inner ring element.

5. The retaining device as set forth in claim 4, wherein the plurality of clamping elements comprises three clamping elements, and the plurality of supporting surfaces comprises three supporting surfaces.

6. The retaining device as set forth in claim 1, wherein the clamping element includes:

a spindle pin mounted in the inner ring element rotatably about an axis of rotation, and a clamping surface oriented substantially at a right angle to the axis of rotation and connected to the spindle pin.

7. The retaining device as set forth in claim 6, wherein the clamping surface is oriented parallel to the supporting surface.

8. The retaining device as set forth in claim 1, wherein the retaining ring further includes:

a positioning element arranged at an inner surface of the outer ring element facing towards the inner ring element, and a counterpart positioning portion corresponding to the positioning element, the counterpart positioning portion being arranged at an outer surface of the inner ring element facing towards the outer ring element.

9. The retaining device as set forth in claim 8, wherein the positioning element is a positioning nose.

10. A processing apparatus for processing a dental workpiece, the processing apparatus comprising the retaining device as set forth in claim 1.

11. The processing apparatus as set forth in claim 10, wherein:

the processing tool is a milling cutter, and the tool drive device is configured to rotate the processing tool relative to the processing spindle.

12. The processing apparatus as set forth in claim 10, further comprising:

a housing, a processing spindle moveable relative to the housing, a spindle drive device for moving the processing spindle relative to the housing, a processing tool mounted to the processing spindle, and a tool drive device configured to move the processing tool relative to the processing spindle.

13. The processing apparatus as set forth in claim 12, wherein the retaining device further includes a retaining ring receiver configured to support the retainer ring therein, and a carrier to which the retaining ring receiver is mounted, the carrier being mounted to the housing of the processing apparatus or being formed in one piece with the housing.

14. The retaining device as set forth in claim 1, further comprising an annular retaining ring receiver configured to receive the retaining ring such that the retaining ring is mounted moveably therein.

15. The retaining device as set forth in claim 14, wherein the annular retaining ring receiver is configured to receive the retaining ring such that the retaining ring is mounted rotatably therein.

16. The retaining device as set forth in claim 14, further comprising a first drive device configured to move the retaining ring relative to the retaining ring receiver.

17. The retaining device as set forth in claim 16, wherein the first drive device is mounted to the retaining ring receiver and is configured to rotate the retaining ring relative to the retaining ring receiver.

18. The retaining device as set forth in claim 14, further comprising a carrier to which the retaining ring receiver is mounted so as to be moveable by a second drive device.

19. The retaining device as set forth in claim 18, wherein the retaining ring receiver is rotatably mounted to the carrier so as to be rotated by the second drive device.

20. A method for processing a disk-shaped dental workpiece in the processing apparatus as set forth in claim 12, the method comprising:

receiving the dental workpiece in the retaining ring, clamping the dental workpiece to the retaining ring using the clamping device, processing the dental workpiece using the processing tool, releasing the inner ring element together with the processed dental workpiece clamped therein from the outer ring element, passing the inner ring element together with the dental workpiece to a further processing apparatus or to a storage location, refitting the inner ring element together with the dental workpiece in the outer ring element, positionally accurately fixing the inner ring element to the outer ring element, and continuing the processing of the dental workpiece clamped in the inner ring element.

21. A retaining device for retaining a disk-shaped dental workpiece, the retaining device comprising:

a retaining ring having a central axis and configured to receive the dental workpiece, and a clamping device configured to clamp the dental workpiece to the retaining ring, the clamping device including:

a supporting surface for supporting the dental workpiece, the supporting surface being mounted or formed on the retaining ring and projecting radially in the direction of the central axis, and a clamping element mounted moveably on the retaining ring, the clamping device being configured to clamp the dental workpiece between the clamping element and the supporting surface in a clamping position, wherein the retaining ring includes:

an inner ring element having a circular inner space defined by a circular inner surface on which the supporting surface is mounted or formed, and the clamping element is moveably mounted on the inner ring element, the workpiece to be mounted within the circular inner space of the inner ring element so as to be clamped between the clamping element and the supporting surface, an outer ring element in which the inner ring element is to be mounted, and a fixing device configured to releasably fix the inner ring element to the outer ring element, wherein the retaining ring and the clamping device are configured to clamp the workpiece directly between the clamping element and the supporting surface.

*     *     *     *     *